United States Patent [19]
Uenishi

[11] Patent Number: 5,184,171
[45] Date of Patent: Feb. 2, 1993

[54] ELECTRONIC FLASH DEVICE

[75] Inventor: Akio Uenishi, Fukuoka, Japan

[73] Assignee: Mitsubishi Denki Kabushiki Kaisha, Tokyo, Japan

[21] Appl. No.: 644,562

[22] Filed: Jan. 23, 1991

[30] Foreign Application Priority Data

Feb. 5, 1990 [JP] Japan .................... 2-26821

[51] Int. Cl.$^5$ ...................... G03B 15/05; H05B 41/00
[52] U.S. Cl. ................................. 354/416; 315/241 P
[58] Field of Search ................... 354/416, 417, 145.1, 354/127.11, 127.12, 472; 315/241 P; 357/34

[56] References Cited

U.S. PATENT DOCUMENTS

| | | | |
|---|---|---|---|
| 4,184,756 | 1/1980 | Land et al. | 354/145.1 X |
| 4,256,995 | 3/1981 | Ishida | 315/241 P |
| 4,309,092 | 1/1982 | Kitagawa | 354/416 |
| 4,697,906 | 10/1987 | Kobayashi et al. | 354/416 |
| 4,839,686 | 6/1989 | Hosomizu et al. | 354/145.1 X |
| 4,847,538 | 7/1989 | Iwata et al. | 315/241 P |
| 5,004,958 | 4/1991 | Hirata | 315/241 P |

Primary Examiner—L. T. Hix
Assistant Examiner—Jae Noh
Attorney, Agent, or Firm—Oblon, Spivak, McClelland, Maier & Neustadt

[57] ABSTRACT

In an electronic flash device according to the present invention, a main condenser (101) charged by a high power voltage supply (100) is connected in series with a flash discharge tube (102) and an IGBT (104). To the gate of the IGBT (104), bias voltage is applied by a gate bias power supply (105') before a flash start signal is provided, and the IGBT (104) waits, in an ON state that the flash discharge tube (102) is triggered in response to the flash start signal. When predetermined time elapses after the flash discharge tube (102) starts to flash, a flash stop circuit (106') changes gate bias voltage of the IGBT (104) so as to shift the IGBT (104) to an OFF state by predetermined time width. Application of high voltage to the IGBT (104) is made for extremely short period of time in the OFF state. Consequently, requirement for high breakdown voltage and less leaking current is eased. In addition, a gate controlling circuit becomes simple.

11 Claims, 5 Drawing Sheets

ELECTRONIC FLASH DEVICE

BACKGROUND OF THE INVENTION

1. Field of the Invention

The present invention relates to an electronic flash device and, more particularly, it relates to a modified control system of the electronic flash device used for photo shooting.

2. Description of the prior art

A circuit to control on and off for discharge tube current by a semiconductor switching device connected in series to the flash discharge tube, in an electronic flash device used for an auxiliary light source for photo shooting, has been formerly realized by various kinds of semiconductor devices. As momentary current and voltage are great, formerly a thyristor inverter has been mainly used, but recently, a self-arc-extinguishing-type switching device has become high in performance, so that various kinds of such device's applications have been proposed.

Figure 1:
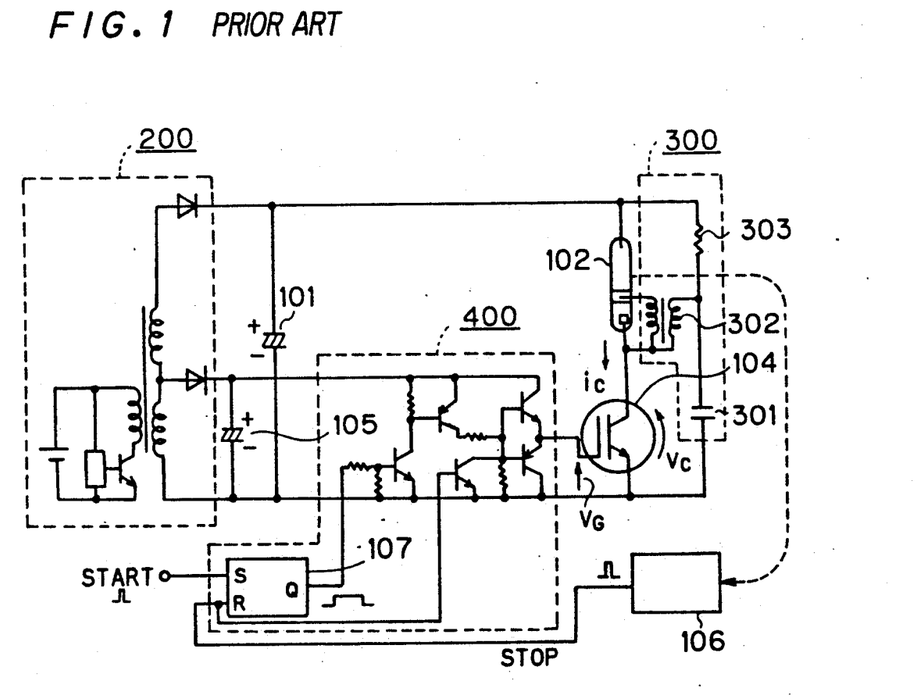
FIG. 1 is a circuit diagram showing a conventional electronic flash device.

FIG. 1 shows an example of the control circuit realized by using an insulated-gate bipolar transistor (IGBT). Similar invention is disclosed in U.S. Pat. No. 4,839,686. A high voltage power supply circuit 200 which generates a high voltage power of around 300 V by stepping cell voltage up by a DC-DC converter, is connected in parallel with a main condenser 101. The main condenser 101, a flash discharge tube 102 and an IGBT 104 are connected in series, and a trigger circuit 300 for giving the trigger signals to the flash discharge tube 102 is connected in parallel with the flash discharge tube 102.

Besides, a gate control circuit 400 which controls a operation of the IGBT 104 by turning on/off gate voltage of the IGBT 104, is connected to the gate of the IGBT 104, and the power supply of the gate control circuit 400 is obtained from a condenser 105 which gives DC voltage of around 30 V after receiving and smoothing rectified voltage from a diode connected to a tap of a voltage stepping-up coil of the DC-DC converter included in the high voltage power supply circuit 200.

In addition, a flash stop signal generating circuit 106 which generates a flash stop signal (a STOP signal) at predetermined time after a start of the flashing of the flash discharge tube 102, is connected to the flash discharge tube 102. The flash stop signal generating circuit 106 is connected to a reset terminal R of a R-S flip-flop 107. A flash start signal (a START signal) sent from a microcomputer and the like in a camera not shown, is given to a set terminal S of the R-S flip-flop 107. An output terminal Q of the R-S flip-flop 107 is connected to a base of a first step transistor within the gate control circuit 400.

High voltage of around 300 V and medium voltage of around 30 V are generated by working the DC-DC converter within the high voltage circuit 200 to charge the main condenser 101 and the condenser 105, respectively. High voltage from the high voltage power supply circuit 200 charges a trigger condenser 301 within the trigger circuit 300 through a resistor 303.

The gate control circuit 400 has to generate output voltage low enough for the IGBT 104 to be kept off till the flash start signal (the START signal) is given. Around total voltage of the high voltage from the high voltage power supply circuit 200, is applied to a collector of the IGBT 104.

When the flash start signal (the START signal) from a microcomputer and the like in a camera not shown, is put to the set terminal S of the R-S flip-flop 107 and then a "H" level from the output terminal Q of the R-S flip-flop 107 is put to the base of the first step transistor within the gate control circuit 400, the gate control circuit 400 gives voltage of around 30 V charged in the condenser 105 to the gate of the IGBT 104 to turn on the IGBT 104. In this way, the IGBT 104 is turned on between main electrodes, so that electric charges charged in the trigger condenser 301 within the trigger circuit 300 flows through a primary coil of a trigger transformer 302 to generate high voltage in the secondary coil. Thus the flash discharge tube 102 is triggered. When the flash discharge tube 102 is turned on, main discharge current flows in order from the main condenser 101, the flash discharge tube 102, the IGBT 104 to the main condenser 101, and the flash discharge tube 102 starts to flash.

Before the discharge from the main condenser 101 is over, the flash stop signal generating circuit 106 composed of a photo-diode, etc. detects photo signals from the flash discharge tube 102 and generates the flash stop signal (the STOP signal). The STOP signal is put to the reset terminal R of the R-S flip-flop 107, and a "L" level from the output terminal Q of the R-S flip-flop 107 is put to the first step transistor within the gate control circuit 400. In response to this, the gate control circuit 400 immediately cut off the output voltage, and quickly lowers the gate voltage given to the IGBT 104 till then down to the low voltage enough. In this way, the IGBT 104 turns off. As current having flowed through the flash discharge tube 102 till then is cut off, the flashing stops.

Collector voltage of the IGBT 104 rises and the trigger condenser 301 in the trigger circuit 300 is recharged to the original state, so that a state, before the flash start signal (the START signal) is given, is recovered. Thus, one cycle is over.

Figure 2:
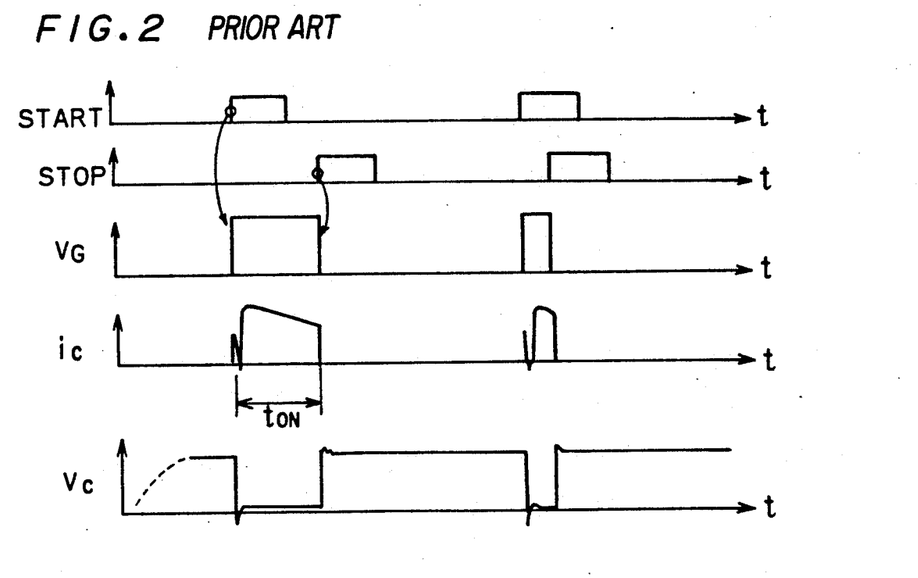
FIG. 2 is a timing chart showing the operation of the circuit in FIG. 1.

FIG. 2 shows a timing chart showing working of the circuit in the FIG. 1. Usually, as the flash start signal (the START signal) is generated by the microcomputer in the camera, the pulse width of the signal is comparatively great as shown in FIG. 2. On the other hand, there is a case where flash pulse width are needed to be short as some 10 micro-seconds. In this case, the flash start signal (the START signal) sometimes continues to be generated even after the flash stop signal generating circuit 106 outputs the flash stop signal (the STOP signal). In order to meet with it, a gate circuit has to be provided in the gate control circuit 400 in addition to the flip-flop circuit for generating the continued pulse width.

Though many of electronic circuits for controlling flashing duration of an electrode flash tube, are made integrated, as a circuit to perform the gate control of the IGBT 104 needs somewhat higher voltage, combination of discrete elements is needed to realize the circuit.

Thus, in former electronic flash devices, the IGBT 104 is controlled to be always off in waiting state till the flash discharge tube 102 starts to flash, so that high voltage is continuously applied between main electrodes of the IGBT 104. Besides it is necessary to extremely lessen leaking current from the IGBT 104 so as to enough charge the trigger condenser 301 in the trigger circuit 300. Consequently, high breakdown voltage of the IGBT 104 has to be secured, leading to increase of the chip size of the IGBT 104, so that lowering the cost was difficult.

In addition, in the gate control circuit 400, switching speed of the gate voltage is needed to be enough high upon on or off of the IGBT 104. In other words, as it is so composed that the flash discharge tube 102 is triggered through discharge of the capacity of the trigger condenser 301 by turn-on of the IGBT 104, the turn-on speed of the IGBT 104 is needed to be enough high for securing sufficient output voltage from the trigger circuit 300. In addition, the gate voltage is needed to be cut off enough quickly to prevent excessive flashing due to lags of the turn-off and the fall time of the IGBT 104.

Even in the IGBT device in which the gate current does not flow continuously, comparatively large chip size is needed for the IGBT 104 to control large current more than 100 A needed for the electronic flash device. Consequently, as parasitic capacity of the IGBT 104 becomes considerably high, around some 100 mA of output current from the gate control circuit 400 has to be flowed to drive the gate of the IGBT 104 at enough high speed. Accordingly, a comparatively large chip size is required for an output step transistor in the gate control circuit 400 to make it possible to flow around 500 mA at 50 V, and high breakdown voltage, around 50 V, is also required for the transistor which acts in conjunction with levels of the START and the STOP signals. Besides, the flip-flop circuit 107 for generating the continuous output voltage during the flash duration has to be provided, so that large number of parts are needed, resulting in becoming large in size of the circuit.

In addition, as charging and discharging to and from the trigger condenser 301 of the trigger circuit 300 are made through the coil of the trigger transformer 302 by switching of the IGBT 104, resonant voltage created from the capacity of the trigger condenser 301 and inductance of a coil of the trigger transformer 302, is generated upon the switching of the IGBT 104. As there are cases where reverse voltage is applied to the IGBT 104 upon turn-on of the IGBT 104 or surge voltage is applied to it upon the turn-off of the IGBT 104, the IGBT 104 has to be designed to endure these stresses, which disadvantageously causes the increase of cost.

SUMMARY OF THE INVENTION

An electronic flash device according to the present invention comprises first power supply means, a main condenser charged by the first power supply means, a discharge tube for flashing by consuming electric energy charged in the main condenser, a trigger circuit for triggering the discharge tube in response to a flash start instruction, an insulated gate type semiconductor switching device having main electrodes is connected in series with the main condenser and the discharge tube to form a discharge loop, second power supply means for supplying, prior to the flash start instruction, gate voltage enough to turn on the insulated gate type semiconductor switching device, to the gate of the insulation gate type semiconductor switching device, and a flash stop circuit for stopping flashing of the discharge tube by changing the gate voltage, in order to make the insulated gate type semiconductor switching device shift to an OFF state by predetermined time width, after predetermined time elapses from start of flashing of the discharge tube.

According to the present invention, gate voltage is applied so that the IGBT connected in series to the flash discharge tube is always turned on when there is possibility of application of flash start instruction (i.e., waiting state), and the gate voltage is temporarily taken off when the flash stop signal is provided. Triggering to the flash discharge tube by the flash start instruction is carried out by another way. Thus, voltage application duration for a insulated gate type semiconductor device and requirement for leaking current become less, so that cost reduction for the IGBT is made possible.

In addition, as a gate control circuit is simplified and number of parts is reduced, production of a small-sized product and the cost reduction are made possible. This device can be operated by START and STOP signals of the same timing as in a conventional integrated circuit used in a thyristor-inverter system, resulting in being easy in diversion of the conventional integrated circuit. As there are not interchanges of energy to and from a trigger condenser or inductance of a trigger transformer, surge voltage does not generate, resulting in high reliability as a whole.

Accordingly, it is an object of the present invention to decrease application time for voltage applied to the insulated-gate type semiconductor device and requirement for leaking current and simplify a gate control circuit, in order to provide a low-priced electronic flash device with high reliability.

These and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 3:
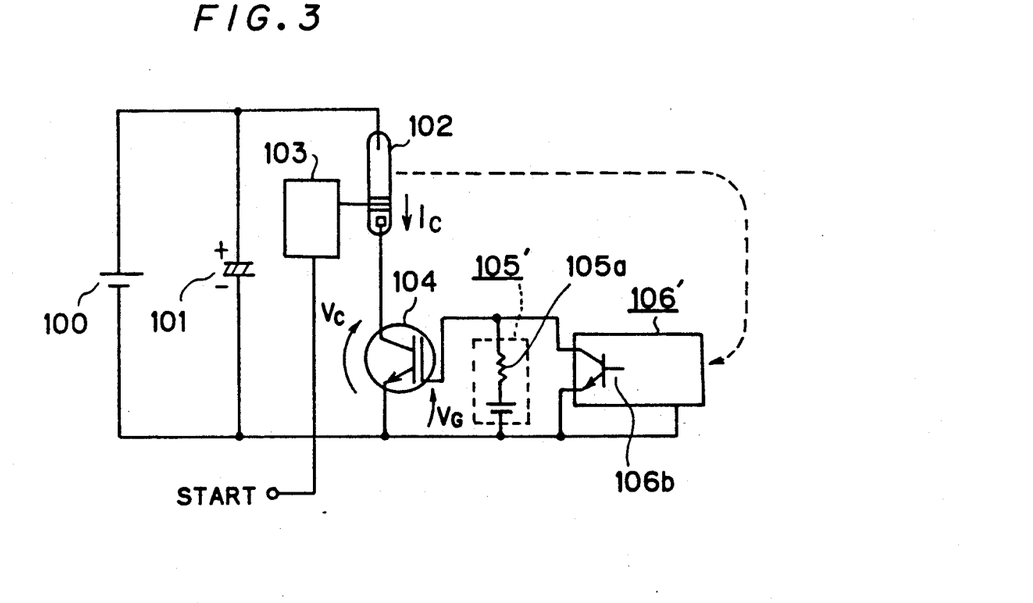
FIG. 3 is a circuit diagram showing an electronic flash device of one embodiment of the present invention.

FIG. 3 is a circuit diagram showing an electronic flash device of one embodiment of the present invention. In FIG. 3, a power supply 100 composing the primary power supply with around 300 V is connected in parallel with a main condenser 101. The power supply 100 may be composed by the same way as the high voltage power supply circuit 200 in FIG. 1. The main condenser 101, a flash discharge tube 102 and an IGBT 104 (in the figure, an N channel enhancement type) are connected in series to form a main discharge loop. To this flash discharge tube 102, a trigger circuit 103 to give the trigger signal is connected. A flash start signal (a START signal), sent from a microcomputer, etc. in a camera not shown, is given to the trigger circuit 103. In addition, a power supply 105' composing a secondary power supply with around 30 V, which gives gate bias across a gate and an emitter of the IGBT 104, is connected between the gate and the emitter of the IGBT 104.

A flash stop circuit 106' to make the flash stop by turning off the IGBT 104 after predetermined duration after flashing of the flash discharge tube 102, is provided. A collector and an emitter of a transistor 106b, an output element of the flash stop circuit 106', is connected to a gate and an emitter of the IGBT 104, respectively. A dot line from the flash discharge tube 102 to the flash stop circuit 106' shows a light signal.

The operation of the circuit will now be described. When the electronic flash device is in a waiting state (i.e., in a state possible in receiving the START signal), a power supply 100 generates predetermined voltage to charge a main condenser 101 and the gate bias power supply 105' generates predetermined voltage to bias the gate of the IGBT 104 so that the IGBT 104 can surely be on. In this state, high impedance conditions are to be created by setting free the output of the flash stop circuit 106', that is, by turing off the output transistor 106b. The gate bias power supply 105' has an internal resistance 105a as shown in FIG. 3.

When a flash start signal (a START signal) is sent from a camera and the like not shown, the trigger circuit 103 responds to that to generate high voltage pulse, to trigger the flash discharge tube 102. When the flash discharge tube 102 turns on, as the IGBT 104 connected in series with the flash discharge tube 102 already turns on, discharge current $i_c$ flows in order from the main condenser 101, the flash discharge tube 102, the IGBT 104 to the main condenser 101, and the flash discharge tube 102 starts to flash. When the flash stop circuit 106', which comprises a photo diodes, etc. detects a light signal due to the flashing of the flash discharge tube 102 and turns on the output transistor 106b before the termination of the discharge, the gate and the emitter of the IGBT 104 is made to be short-circuited by the output transistor 106b and the gate voltage drops. The internal resistance 105a in the gate bias power supply 105' is preferably enough high in resistance value.

Thus, the IGBT 104 turns off, and collector current $i_c$ is cut off, the flash discharge stops. As the flash discharge tube 102 can be kept off even if the IGBT 104 again turned on, only after a gas in the flash discharge tube 102 descreases in ionization and gives rise to no self-ignition (after a few ms after flash stop), the output transistor 106b of the flash stop circuit 106' is set free or turned off after that. By this, the gate bias power supply 105' biases the gate of the IGBT 104 through its internal resistor 105a with high resistance. In this way, the IGBT 104 is gate-biased so that it can again return to ON conditions or waiting conditions mentioned before.

In this circuit, the IGBT 104 is gate-biased to be always on in the waiting state, and collector voltage it not applied. Leaking current through the collector and the emitter is allowable only if it is below holding current (normally 10 mA) of the flash discharge tube 102, so that the leaking current need not be especially low.

In addition, in insulated-gate type semiconductor device including the IGBT 104, as the leaking current through between the gate and the emitter is extremely less or in degree of pico-ampere, the loss does not arise in the least even if the gate bias is always applied. Considering response time normally required to the circuit, the internal resistor 105a in the gate bias power supply 105' can be enough employed only if the resistance is not more than around 1 MΩ, and quantity of charge discharged from the gate bias power supply 105' during duration of the flash stop is all right if it is not more than 1 micro-coulomb. Accordingly, the capacity can be around a few micro-farad even if the gate bias power supply 105' is composed of such a condenser 105 as shown in FIG. 1. Besides, in connection with a change of collector voltage $V_C$ upon turn-on and turn-off of the IGBT 104, there is no generation of the surge voltage, as it does not interact with the capacity of a trigger condenser and inductance of a trigger transformer contained in the trigger circuit 103 (refer to FIG. 5).

Figure 4:
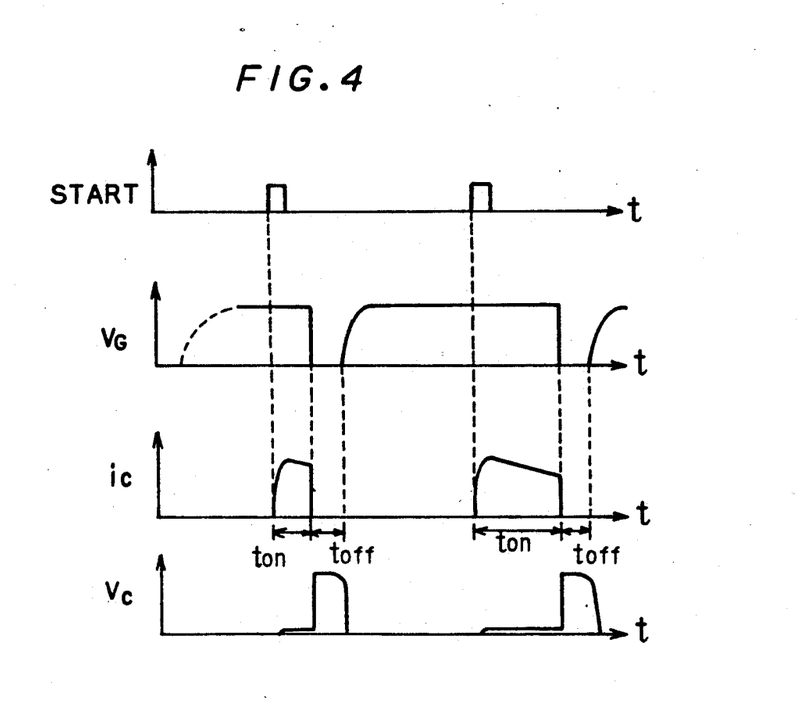
FIG. 4 is a timing chart showing the operation of the circuit in FIG. 3.

FIG. 4 is a timing chart showing operation of a circuit of FIG. 3. At the time of raise-up of a START signal, the gate voltage $v_g$ of the IGBT 104 reach the level to turn on the IGBT 104, so that as soon as the flash discharge tube 102 is triggered by the raise-up of the START signal, collector current $i_c$ can flow through the IGBT 104 to light the flash discharge tube 102. At this instant, the collector voltage $v_c$ of the IGBT 104 becomes around "0".

Then, when predetermined luminescence is attained after $t_{ON}$ time elapses, based on a photo-electric conversion signal from photodiode (not shown) in the flash stop circuit 106', the output transistor 106b in the flash stop circuit 106' is turned on and a gate and an emitter in the IGBT 104 is short-circuited. Consequently, the gate voltage $v_g$ applied to the IGBT 104 drops to turn off the IGBT 104. Likewise, the collector current $i_c$ through the IGBT 104 becomes also around "0". The collector voltage vc of the IGBT 104 becomes nearly equal to output voltage value from the power supply 100.

When $t_{off}$ time elapses so that ionization of gas inside the flash discharge tube 102 descreased not to cause self-arc-ignition, the output transistor 106b in the flash stop circuit 106' is again turned off to apply the gate voltage $v_g$ to the IGBT 104. Thus 1 cycle is completed.

The luminescence amount (i.e. lighting time $t_{on}$) from the flash discharge tube 102 can be controlled as shown in FIG. 4 by a controlling singal applied from microcomputer and the like in the camera.

There is no specific limitation for relationship between pulse width of the flash start signal (START singal) and flash stop period $t_{off}$ (i.e. ON period of the output transistor 106b). As the gate voltage is always put to the gate of the IGBT 104 by the gate bias power supply 105' during flashing of the flash discharge tube 102 which is triggered by the START signal, the flip-flop 107 which is required in conventional circuit for continuously supplying gate voltage, to the gate of the IGBT 104 becomes unnecessary.

Figure 5:
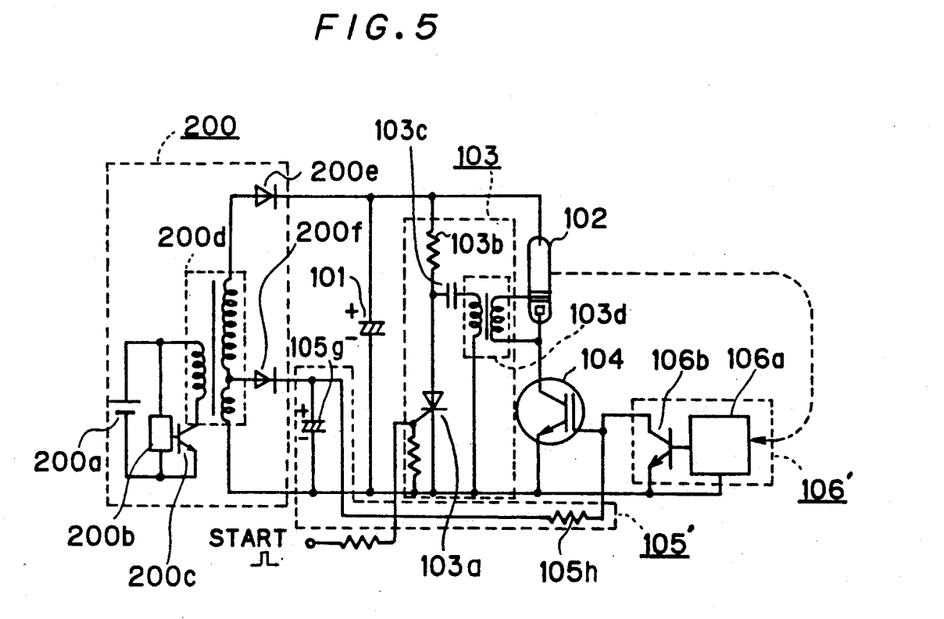
FIG. 5 is a circuit diagram showing an electronic flash device of another embodiment of the present invention.

FIG. 5 is a circuit diagram showing another embodiment of the electronic flash device according to the present invention. The circuit in the FIG. 5 is, as the former circuit in the FIG. 1, provided with a high voltage power supply circuit 200 composed using a DC-DC converter. In addition, a thyristor switch 103a is used in the trigger circuit 103. Besides as the gate bias power supply 105', part of output voltage from the DC-DC converter in the high voltage power supply circuit 200 is rectified for its usage.

In response to output from a transistor driver 200b, a transistor 200c repeats ON/OFF in the high voltage power supply circuit 200. The transistor 200c chops the output voltage of the cell 200a to generate a rectangular wave signal, which is in turn stepped up by a transformer 200d and then rectified by a rectification diode 200e to generate high voltage of around 300 V. This high voltage power circuit 200 is connected in series with the main condenser 101 to charge the main condenser 101. In addition, voltage of around 30 V rectified by a rectification diode 200f contacted to an intermediate tap of a secondary coil in the transformer 200d is charged in a condenser 105g in the gate bias power supply 105'. The gate bias power supply 105' apply the DC voltage charged by the condenser 105g to the gate of the IGBT 104 through the resistor 105h. The high voltage power circuit 200 is connected in series with a resistor 103b, the condenser 103c and a primary coil of a transformer 103d in the trigger circuit 103, so that the condenser 103c is charge by high voltage power circuit 200.

When the START signal ("H" level) sent from a microcomputer and the like in the camera is applied to the gate of the thyristor 103a in the trigger circuit 103 which is connected in series with the main condenser 101, the thyristor 103a is turned on. Since a discharge loop of the condenser 103c in the trigger circuit 103 is formed, the discharge of the condenser 103c starts. When the current flows through the primary coil of the transformer 103d in the trigger circuit 103, high voltage is generated in the secondary coil of the transformer 103d to trigger the flash discharge tube 102. As the gate voltage of the IGBT 104 was already applied from the gate bias power supply 105', discharge current from the main condenser 101 flows through the flash discharge tube 102 and the IGBT 104 and thus the flash discharge tube 102 flashes.

When predetermined time elapses after the flash discharge tube 102 starts to flash, the luminescence amount is detected by a photo-diode included in a transistor driver 106a in the flash stop circuit 106', and the transistor driver 106a turns on between the collector and the emitter of the transistor 106b. By this, the IGBT 104 is turned off, so that flashing of the flash discharge tube 102 stops. Thus 1 cycle is completed.

Figure 6:
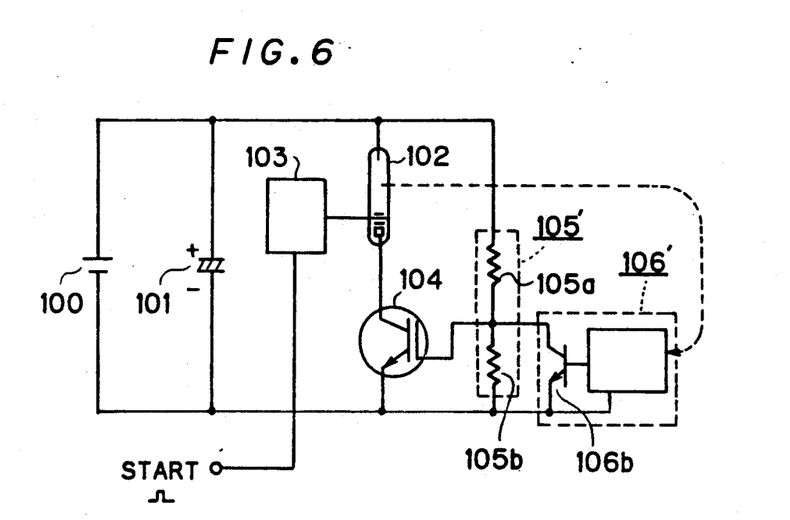
FIG. 6 shows still another embodiment of the present invention.

FIG. 6 is a circuit diagram showing still another embodiment of the present invention. In the circuit in FIG. 6, the gate bias power supply 105' is composed of resistors 105a and 105b to divide the voltage of the power supply 100. The resistor 105a may have resistance around 10 MΩ and the resistor 105b may have resistance around 1 MΩ. The circuit becomes the simplest in structure, but a loss of around 10 mW is always generated in the resistors 105a and 105b. Therefor, this circuit is available for a product short in waiting time.

In addition, only one transistor 106b is needed as a transistor of high voltage and high current to control the IGBT 104. Though one thyristor 103a is needed for the trigger circuit 103, the flip-flop circuit and a transistor for level shift use are not needed. Therefore, a compact circuit can be realized.

Figure 7:
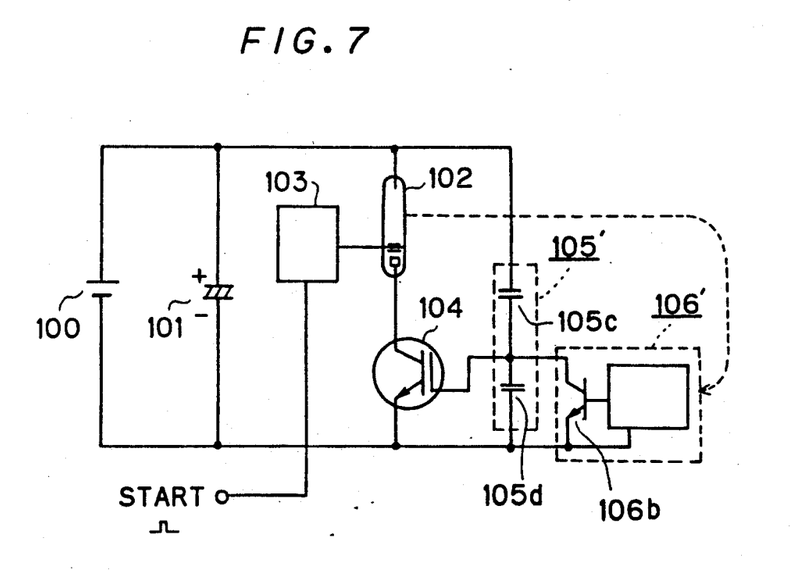
FIG. 7 shows still another embodiment of the present invention.

In the circuit of FIG. 6, the gate bias power supply 105' is constructed by resistance-division, but power consumption cannot be neglected. The division by capacity of condensers 105c and 105d, as shown in FIG. 7, is available, to decrease power loss.

Flashing stop period ($t_{off}$) of the flash stop circuit 106' may be implemented by providing a timer circuit in the flash stop circuit 106'. The timer circuit starts to count time from ON of the output transistor 106b and gives singal output to turn off the output transistor 106b when predetermined time ($t_{off}$) elapses.

The gate voltage of the IGBT 104 rises depending on time constant determined by gate-to-emitter parastic capacity of the IGBT 104 (if not enough, external condenser may be connected in parallel) and internal resistance of the gate bias power supply 105'. Accordingly, if the construction is so made that the output transistor 106b is turned on for a moment extremely shorter than $t_{off}$, as duration till the IGBT 104 is again turned on is determined according to the above time constant, any $t_{off}$ can be realized by this.

Figure 8:
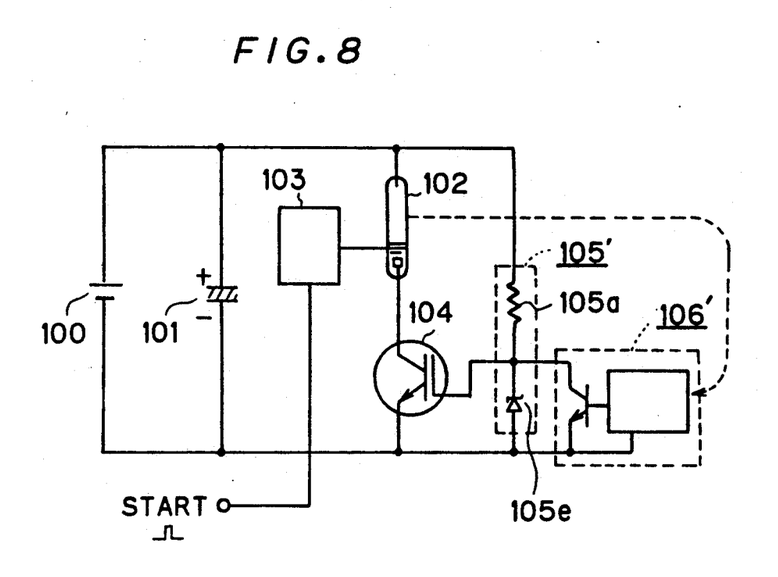
FIG. 8 shows still another embodiment of the present invention.
Figure 9:
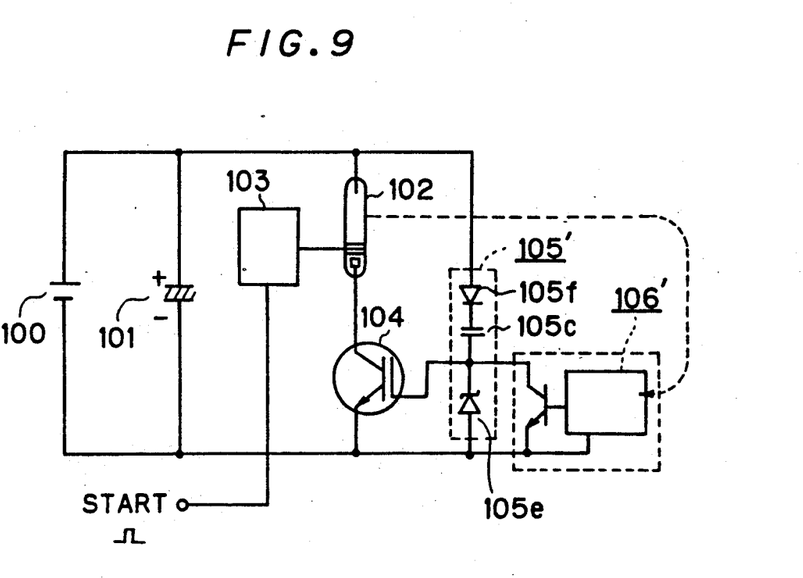
FIG. 9 shows still another embodiment of the present invention.

FIG. 8 shows a modified circuit having a zener diode 105e replacing the resistor 105b in the gate bias power supply 105' in the FIG. 6. FIG. 9 shows another modified circuit having a condenser 105c and a diode 105f replacing the resistor 105a in the gate bias power supply 105' in FIG. 8. In the circuit of FIG. 8, constant voltage generated from the zener diode 105e is supplied to the gate of the IGBT 104, and the rest is consumed in the resistor 105a. In the circuit of FIG. 9, constant voltage generated by the zener diode 105e is supplied to the gate of the IGBT 104, and the rest is charged in the condenser 105c. The diode 105f in FIG. 9 is a reverse current preventing diode which works to prevent charges stored in te condenser 105c from reversely flowing to be supplied to the IGBT 104. Both circuits can perform the same operation as the circuit of FIG. 6.

As an insulated gate type semiconductor device other than the IGBT 104 mentioned before, devices such as a MOSFET, a bipolar transistor drived by the MOSFET (BIMOS) or a MOS controlled thyristor can be used in the present invention. If, in these devices, element with negative characteristics in threshold voltage is made practical, gate bias power supply for turning the elemnet on becomes unnecessary. On that occasion, the flash stop circuit 106' must be constructed so that gate reverse bias is applied to turn the element off.

Although the present invention has been described and illustrated in detail, it is clearly understood that the same is by way of illustration and example only and is not to be taken by way of limitation. The spirit and scope of the present invention should be limited only by the terms of the appended claims.

What is claimed is:

1. An electronic flash device, comprising:
   first power supply means;
   a main condenser charged by said first power supply means;
   a discharge tube for flashing by consuming electric energy charged in said main condenser;
   a trigger circuit for triggering said discharge tube in response to a flash start instruction;
   an insulated gate type semiconductor switching device having main electrodes connected in series with said main condenser and said discharge tube to form a discharge loop;
   second power supply means for supplying gate voltage sufficient to turn on said insulated gate type semiconductor switching device, to the gate of said insulated gate type semiconductor switching device throughout waiting and flashing states of said insulated gate type semiconductor switching device; and
   a flash stop circuit for stopping flashing of said discharge tube by changing said gate voltage, in order to make said insulation gate type semiconductor switching device shift to an OFF state by predetermined time width, after predetermined time elapses from start of flashing of said discharge tube.

2. An electronic flash device in accordance with claim 1, wherein
said first power supply means comprises
a cell, and
a DC-DC converter for converting an output voltage of said cell into high voltage.

3. An electronic flash device in accordance with claim 2, wherein
said DC-DC converter comprises
a transistor for chopping the output voltage of said cell,
a transformer for stepping up an output from said transistor, and
a diode for rectifying an output from said transformer.

4. An electronic flash device in accordance with claim 3, wherein
said transformer comprises a high voltage generating portion to generate relatively high voltage and a low voltage generating portion to generate relatively low voltage, and
said diode includes a first diode to rectify said high voltage generated from said high voltage generating portion and a second diode to rectify said low voltage generated from said low voltage generating portion.

5. An electronic flash device in accordance with claim 4, wherein
said second power supply means comprises a condenser for charging said low voltage generated from said low voltage generating portion.

6. An electronic flash device in accordance with claim 1, wherein
said second power supply means comprises first and second resistors for dividing an output voltage of said first power supply means.

7. An electronic flash device in accordance with claim 1, wherein
said second power supply means comprises first and second condensers for dividing an output voltage of said first power supply means.

8. An electronic flash device in accordance with claim 1, wherein
said second power supply means comprises
a resistor having one terminal connected to an output terminal of said first power supply means and the other terminal connected to a gate of said insulated gate type semiconductor switching device, and
a zener diode having an anode connected to a ground and a cathode connected to the gate of said insulated gate type semiconductor switching device.

9. An electronic flash device in accordance with claim 1, wherein
said second power supply means comprises
a diode having an anode connected to an output terminal of said first power supply means,
a condenser having one terminal connected to a cathode of said diode and the other terminal connected to a gate of said insulated gate type semiconductor switching device, and
a zener diode having an anode connected to a ground and a cathode connected to the gate of said insulated gate type semiconductor switching device.

10. An electronic flash device in accordance with claim 1, wherein
said trigger circuit comprises
a switch having one terminal connected to a ground for turning on in response to said flash start instruction,
a resistor having one terminal connected to the other terminal of said switch and the other terminal connected to one terminal of said discharge tube,
a condenser having one terminal connected to said one terminal of said resistor, and
a voltage stepping-up circuit consisting of a primary coil having one terminal connected to the other terminal of said condenser and the other terminal connected to a ground and a secondary coil having one terminal connected to a control terminal of said discharge tube and the other terminal connected to the other terminal of said discharge tube.

11. An electronic flash device in accordance with claim 1, wherein
said flash stop circuit has a flash stop period determined according to time constant depending on gate capacity of said insulated gate type semiconductor switching device and internal resistance of said second power supply means.

* * * * *